United States Patent
Othman et al.

(10) Patent No.: US 9,393,547 B2
(45) Date of Patent: Jul. 19, 2016

(54) ADSORBENT MATERIAL, PROCESS FOR ITS PREPARATION AND USE THEREOF

(71) Applicant: King Saud University, Riyadh (SA)

(72) Inventors: Mohammed A. Othman, Riyadh (SA); Waleed M. Zahid, Riyadh (SA); Ahmed E. Abasaeed, Riyadh (SA)

(73) Assignee: King Saud University, Riyadh (SA)

( * ) Notice: Subject to any disclaimer, the term of this patent is extended or adjusted under 35 U.S.C. 154(b) by 149 days.

(21) Appl. No.: 14/247,289

(22) Filed: Apr. 8, 2014

(65) Prior Publication Data

US 2014/0348736 A1    Nov. 27, 2014

(30) Foreign Application Priority Data

May 27, 2013   (EP) ..................... 13169355

(51) Int. Cl.
*B01J 20/30* (2006.01)
*B01D 53/48* (2006.01)
*B01D 53/50* (2006.01)
*B01D 53/52* (2006.01)
*B01J 20/06* (2006.01)
*C01G 9/00* (2006.01)
*C01G 49/00* (2006.01)

(52) U.S. Cl.
CPC ............. *B01J 20/3078* (2013.01); *B01D 53/48* (2013.01); *B01D 53/508* (2013.01); *B01D 53/52* (2013.01); *B01J 20/06* (2013.01); *C01G 9/006* (2013.01); *C01G 49/009* (2013.01); *B01D 2253/1122* (2013.01); *B01D 2257/302* (2013.01); *B01D 2257/304* (2013.01); *B01D 2257/308* (2013.01); *C01P 2002/22* (2013.01); *C01P 2002/72* (2013.01); *C01P 2006/10* (2013.01)

(58) Field of Classification Search
None
See application file for complete search history.

(56) References Cited

U.S. PATENT DOCUMENTS 5,785,938 A * 7/1998 Pinnavaia ............ B01D 53/508
423/244.01

OTHER PUBLICATIONS

Mohamed A. Othman et al: "Selectivity of layered double hydroxides and their derivative mixed metal oxides as sorbents of hydrogen sulfide", Journal of Hazardous Materials, vol. 254-255, Mar. 22, 2013, pp. 221-227.
European Search Report for corresponding Application No. EP 13169355.8 dated Oct. 15, 2013.

* cited by examiner

*Primary Examiner* — Melvin C Mayes
*Assistant Examiner* — Michael Forrest
(74) *Attorney, Agent, or Firm* — Renner, Otto, Boisselle & Sklar, LLP

(57) ABSTRACT

The present invention discloses an adsorbent material having the following formula: $Cu_wZn_xFe_yAl_z(OH)_2(A)_{(y+z)/2} \cdot mH_2O$, wherein $w+x+y+z=1$; and $0.20 \leq w \leq 0.60$; $0.20 \leq x \leq 0.60$; $0.05 \leq y \leq 0.25$; $0.05 \leq z \leq 0.25$; $0.20 \leq (y+z) \leq 0.33$; and $0.50 \leq m \leq 0.80$; a process for producing the adsorbent material and its use for removing sulfur-containing matter from gaseous streams.

4 Claims, 1 Drawing Sheet

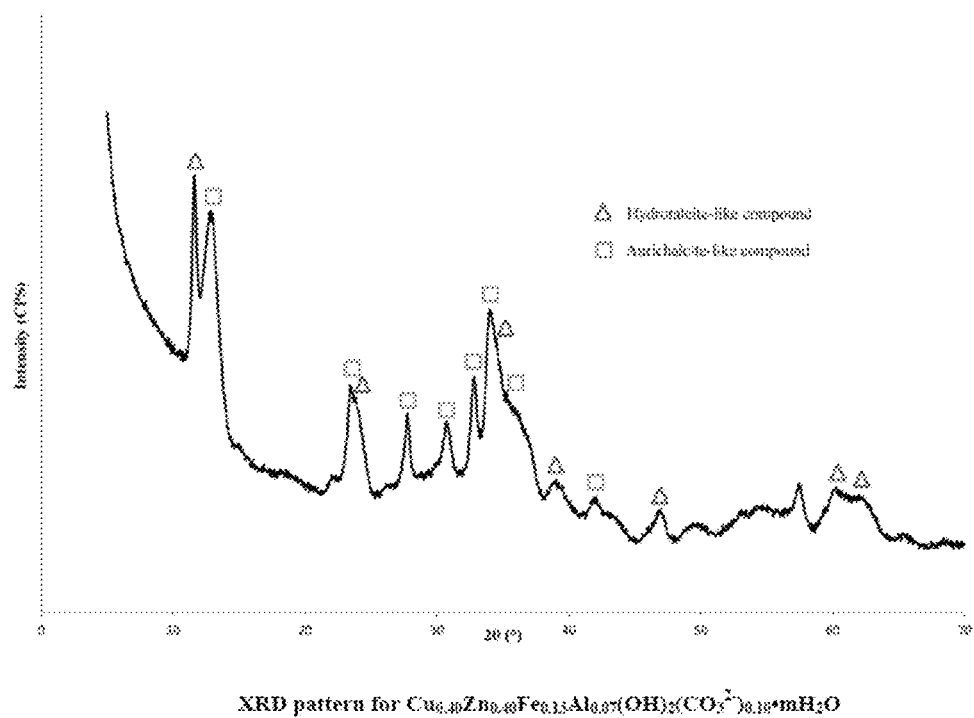

ADSORBENT MATERIAL, PROCESS FOR ITS PREPARATION AND USE THEREOF

PRIORITY CLAIM

The present application claims priority under 35 U.S.C. 119(a) to pending European Application No. 13169355.8, filed May 27, 2013, the entirety of which is hereby incorporated herein by reference.

TECHNICAL FIELD

The present invention relates to an adsorbent material, its preparation and its use for removal of sulfur-containing matters from gaseous streams.

BACKGROUND

The ability to capture inorganic matter makes layered double hydroxides (LDHs) and their derivative mixed metal oxides feasible adsorbents of inorganic materials.

From U.S. Pat. No. 5,358,701 a process for removing sulfur oxides ($SO_x$), nitrous oxides ($NO_x$) and chlorine from a gas stream particularly from flue gases of coal-burning power plant by using LDHs is known. The composition of the LDHs was claimed as $M_{1-x}{}^{II}M_x{}^{III}(OH)_2(A^{n-})_{x/n}.mH_2O$, wherein $M^{II}$ is an alkaline earth metal, and $M^{III}$ is selected from a group consisting of IIIA metal cations. Sulfur dioxide ($SO_2$) gas absorbed onto the hydrotalcite structure as $SO_3{}^{2-}$ anions by replacing most of the gallery $CO_3{}^{2-}$ anions. The spent LDHs were regenerated by calcination at a temperature of 500° C.

U.S. Pat. No. 5,928,496 discloses a process of $SO_2$ adsorption by hydrotalcite-like material. The capacity of the hydrotalcite-like material to adsorb $SO_2$ was enhanced by using acetate anion in interlayer region. $Mg_{1-x}Al_x(OH)_2xA.mH_2O$ hydrotalcite-like material was claimed. Where Mg could be substituted up to 50% by divalent metal cations and Al could be substituted up to 50% by trivalent Cr or Fe metal.

A method for removing elemental sulfur and other sulfur matter from contaminated fluids by hydrotalcite-like material of the formula $Mg_xAl_y(OH)_{2x+3y-z}(NO_3).mH_2O$ is known from U.S. Pat. No. 6,027,636, wherein x, y, z are values from 1 to 6.

In T. J. Toops, M. Crocker, Appl. Catal., B 82, 199-207 (2008) the adsorption of $H_2S$ and COS on two calcined LDHs, $Mg_{0.75}Al_{0.25}(OH)_2(CO_3)_{0.125}$ and $Mg_{0.65}Al_{0.35}(OH)_2(CO_3)_{0.175}$, using Diffused Reflectance Infrared Fourier Transform Spectroscopy (DRIFTS) and chemisorption apparatus to understand the mechanism of adsorption, is described. Both LDHs adsorbed hydrogen sulfide ($H_2S$) irreversibly, but $Mg_{0.75}Al_{0.25}$ had a large capacity for carbonyl sulfide (COS).

H. A. J. van Dijk et al., Int. J. Greenhouse Gas Control 5, 505-511 (2011) used calcined synthetic hydrotalcite with a $MgO:Al_2O_3$ weight ratio of 70:30 that has been promoted with 20 wt % $K_2CO_3$ to enhance the basicity of the mixed oxides. The known adsorbent displayed reversible co-adsorption of $CO_2$ and $H_2S$.

U.S. Pat. No. 7,759,282 discloses a nickel aluminate catalyst for sulfur removal in gaseous stream. $Ni_{2x}Al_2O_{2x+3}$, $Ni_{(2-y)}Ni_y{}^0Al_2O_{(5-y)}$, $Ni_{(4-y)}Ni_y{}^0Al_2O_{(7-y)}$ and $Ni_{(6-y)}Ni_y{}^0Al_2O_{(9-y)}$ catalyst were claimed, wherein X≥0.5 and 0.01≤y≤2.00.

Optimization of mixed metal oxides containing two or three different metals for removing COS was studied by D. E. Sparks et al., Appl. Catal. B, 82, 190-198 (2008). In this known study, different combinations of Ni/Mg/Al, Ni/Mg/Fe, Co/Mg/Al were used for COS adsorption. Ni/Mg/Al mixed oxides had the best performance and a composition with Ni/Mg/Al=0.32/0.48/0.20 showed the best adsorption capacity for COS.

EP 0,986,432 discloses the use of metal ion solution at pH lying in the range of 0.05-7.00 to remove sulfur from gas flow stream. The group of metal ion claimed consists of Zn, Fe, Cu, Ag, Pb, Cd, Co, Mg, Mn, Ni, Sn. The process involved passing sulfur-contaminated gas through a solution containing one of the above stated metals to participate the metal sulfide.

The publication by M. A. Othman et al., J. Hazard. Mater., 254-255, 221-227 (2013) also describes the use of LDHs and mixed metal oxides for removing sulfur from sulfur-contaminated gas or air streams. But here, LDH materials and their calcined mixed metal oxides had been prepared containing either two or three different metals, consisting of the group of Cu, Ni, Zn, Fe, Al, Cr. $Ni_{0.64}Fe_{0.36}$ mixed metal oxide was found to have the best uptake of $H_2S$.

A. E. Palomares et al., Appl. Catal. B, 20, 257-266 (1999) highlight the potential use of a mixed Co/Mg/Al oxide derived from hydrotalcite-like material for the removal of SOx and NOx in fluid catalytic cracking units. The removal of $SO_2$ was enhanced by cerium oxides where Co-based hydrotalcite-like material was used; whereas Cu-based hydrotalcite did not require the addition of cerium oxides.

In the prior art the majority of studies for selecting the best metals for adsorption of inorganic matter on LDHs have been almost limiting to Mg and Al metals. Therefore, the capability of inorganic matter of the known materials is constricted and following the economical feasibility too. Further, screening studies only let to the use of adsorption materials containing two or three different types of metals within the same structure. The metals were screened hardly taking into account their affinity to the inorganic matter, preferably their sulfur affinity.

SUMMARY

It is an object of the present invention to provide an adsorbent material with improved uptake of inorganic matter compared to the known LDH materials and the metal oxide derivatives described in the state of art. Further, it is an object of the invention to provide a method of making the adsorbent material and using it for the purification of contaminated gaseous streams.

The first object is achieved by an adsorbent material having the following formula:

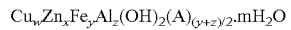
$$Cu_wZn_xFe_yAl_z(OH)_2(A)_{(y+z)/2}.mH_2O$$

wherein w+x+y+z=1; and 0.20≤w≤0.60; 0.20≤x≤0.60; 0.05≤y≤0.25; 0.05≤z≤0.25; 0.20≤(y+z)≤0.33; and 0.50≤m≤0.80.

Preferably, A is $CO_3{}^{2-}$, $SO_4{}^{2-}$, $Cl^-$ and/or $NO_3{}^-$.

More preferred the adsorbent material is not calcined. However, it is also possible that the adsorbent material is in its calcined form, wherein calcination may take place at a temperature of up to 500° C.

Also preferred, the adsorbent material is present in hydrotalcite-like and/or aurichalcite-like structure.

In one preferred embodiment, copper, zinc, ferric and aluminum are present in quadruple aggregated form.

Even preferred the adsorbent material has the formula $Cu_{0.40}Zn_{0.40}Fe_{0.13}Al_{0.07}(OH)_2(CO_3{}^{2-})_{0.1}.mH_2O$.

A further object is achieved by a process of producing the adsorbent material comprising the steps:

i) preparing a first solution of copper, zinc, ferric and aluminum salts in a solvent, preferably water;

ii) preparing an alkaline second solution, preferably by dissolving NaOH and Na$_2$CO$_3$, in water;
iii) mixing the first and the second solutions to provide a precipitate;
iv) filtering, washing, drying and optionally calcining the precipitate obtained in step iii).

Preferably, the precipitate is used after drying.

The adsorbent material of the present invention can be used for removing sulfur-containing matter from gaseous streams.

Preferably, the sulfur-containing matter is selected from H$_2$S, SO$_2$ and/or COS.

It was surprisingly found that the inventive adsorbent material shows significantly improved uptake of inorganic material, especially sulfur-containing matter which can be easily removed by the adsorbent material used for purification of gaseous streams.

The ability to capture inorganic matter like sulfur contaminations makes LDHs and their mixed metal oxides almost unique adsorbents of inorganic material. LDHs and mixed metal oxides are of interest due to their basicity and high surface area that make them excellent adsorbents for acidic gases like H$_2$S and SO$_2$. Different factors determine the characteristic specification of LDHs. Types of the divalent and trivalent metals that constitute the LDHs are important characteristics of this material.

The sulfur removal from gaseous streams comprises the contact of the adsorbent material and the gaseous stream containing the sulfur matter. The main sulfur-contamination in the gaseous streams are H$_2$S and SO$_2$. H$_2$S is an environmental contaminant and a corrosive gas which occurs natural in crude petroleum, natural gas, and sour gas; it is also a by-product of many industrial operations. SO$_2$ is an oxidized state of H$_2$S; released mainly from burning sulfur-contaminated fuel. Environmental and industrial requirements necessitate removal of H$_2$S and SO$_2$.

Many industrial applications can utilize this high sulfur adsorbent material including: flue gas desulfurization, SO$_2$ removal from stack gases, syngas and biogas purification, and H$_2$S removal for odor control (e.g. wastewater treatment plant and sewer pump station).

The innovation comes from the synergetic effects of the preferably quadruple mixed metals of copper, zinc, ferric, and aluminum, preferably in the form of hydrotalcite-like and aurichalcite-like compounds, working together in removing sulfur from gaseous stream.

BRIEF DESCRIPTION OF THE DRAWING

Additional features and advantages of the present invention can be taken from the following detailed description in connection with the examples and the drawing, wherein FIG. 1 is a X-ray diffraction pattern (XRD) for the adsorbent material according to Example 3.

DETAILED DESCRIPTION

EXAMPLES

The adsorbent material in the examples was prepared using two separate solutions. The first solution contains the divalent metals (Cu$^{2+}$ and Zn$^{2+}$) and the trivalent metals (Fe$^{3+}$ and Al$^{3+}$) at various ratios between them. The second solution contains NaOH and Na$_2$CO$_3$ that form the mixed base solution. The amount of the precursor for each component in the two solutions (shown in Examples 1-3 below) was adjusted such that the molar concentrations of the anions in the formed adsorbent are: [OH$^-$]=2.0[M$^{2+}$+M$^{3+}$] and [CO$_3^{2-}$]=[M$^{3+}$]/2.

These two solutions were simultaneously mixed at 2000 rpm in a sharp bladed mixer for 3 minutes. The resulting slurry was aged at 85° C. for 24 h. The final precipitate was filtered, washed thoroughly with distilled water, and dried at 100° C. for 24 h.

In order to test the prepared material for sulfur removal capacity, a breakthrough test was carried out, whereas H$_2$S was selected for the stated test. A mixture of H$_2$S gas and air with H$_2$S concentration of 10,780 ppm (relative humidity 40-45%) was passed through the adsorbent material presented in this invention. A total gas flow rate of 76.5 cm$^3$/min across a 6 mm diameter adsorption tube was used (equivalent to a gas superficial velocity of 4.51 cm/sec). Elapsed time was recorded from the start of H$_2$S/air flow through adsorbent material until 50 ppm H$_2$S breakthrough was recorded in the outlet side of adsorption tube.

The tests were performed at 20° C. and atmospheric pressure in a tubular acrylic glass fixed bed reactor column. The adsorbent material was held in place by plugs of glass wool. The flow rate of H$_2$S was controlled using an Aalborg mass flow controller model DFC26. Air flow rate was controlled using needle valve followed by an Aalborg digital mass meter model XFM17. Gas analyses for H$_2$S were carried out using a Honeywell gas alert micro-5 detector.

H$_2$S uptake by adsorbent material was calculated as follows:

$$H_2S \text{ uptake} = \frac{C_{H_2S} \times F_t \times t \times \rho_{H_2S}}{W_{ad}} \quad (1)$$

Where:
H$_2$S uptake=hydrogen sulfide uptake (g H$_2$S/g adsorbent)
C$_{H_2S}$=Concentration of H$_2$S (ppm)
F$_t$=Total gas flow rate (cm$^3$/min)
t=Elapsed time (min)
ρH$_2$S=Density of H$_2$S (g/cm$^3$)
W$_{ad}$=Weight of adsorbent material (g)

Example 1

The hydrotalcite-like and aurichalcite-like adsorbent (Cu$_{0.33}$Zn$_{0.33}$Fe$_{0.17}$Al$_{0.17}$(OH)$_2$(CO$_3^{2-}$)$_{0.17}$.mH$_2$O) was prepared by dissolving 21.74 grams of Cu(NO$_3$)$_3$.3H$_2$O and 26.77 grams of Zn(NO$_3$)$_2$.6H$_2$O and 18.18 grams of Fe(NO$_3$)$_3$.9H$_2$O, and 16.88 grams of Al(NO$_3$)$_3$.9H$_2$O in 400 ml distilled water to form the first solution; whereas the second (base) solution was prepared by dissolving 17.28 grams of NaOH and 19.08 grams of Na$_2$CO$_3$ in 400 ml distilled water. Following the procedure outlined above, these precursors yielded approximately 13.5 grams of adsorbent material with 0.64 g/cm$^3$ bulk density. 0.1 gram of adsorbent material was used for breakthrough test. The final molar ratio of Cu:Zn:Fe:Al was 0.33:0.33:0.17:0.17.

Example 2

The hydrotalcite-like and aurichalcite-like adsorbent (Cu$_{0.33}$Zn$_{0.33}$Fe$_{0.22}$Al$_{0.11}$(OH)$_2$(CO$_3^{2-}$)$_{0.17}$.mH$_2$O) was prepared by dissolving 21.74 grams of Cu(NO$_3$)$_3$.3H$_2$O and 26.77 grams of Zn(NO$_3$)$_2$.6H$_2$O and 24.24 grams of Fe(NO$_3$)$_3$.9H$_2$O, and 11.25 grams of Al(NO$_3$)$_3$. 9H$_2$O in 400 ml distilled water to form the first solution; whereas the second (base) solution was prepared by dissolving 17.28 grams of NaOH and 19.08 grams of Na$_2$CO$_3$ in 400 ml distilled water. Following the procedure outlined above, these precursors yielded approximately 13.5 grams of adsorbent material with 0.77 g/cm³ bulk density. 0.1 gram of adsorbent material was used for breakthrough test. The final molar ratio of Cu:Zn:Fe:Al was 0.33:0.33:0.22:0.11.

Example 3

The hydrotalcite-like and aurichalcite-like adsorbent ($Cu_{0.40}Zn_{0.40}Fe_{0.13}Al_{0.07}$ $(OH)_2(CO_3^{2-})0.10.mH_2O$) was prepared by dissolving 21.74 grams of $Cu(NO_3)_3.3H_2O$ and 26.77 grams of $Zn(NO_3)_2.6H_2O$ and 12.12 grams of $Fe(NO_3)_3.9H_2O$, and 5.63 grams of $Al(NO_3)_3.9H_2O$ in 400 ml distilled water to form the first solution; whereas the second (base) solution was prepared by dissolving 14.4 grams of NaOH and 9.54 grams of $Na_2CO_3$ in 400 ml distilled water. Following the procedure outlined above, these precursors yielded approximately 12.0 grams of adsorbent material with 0.71 g/cm³ bulk density. 0.1 gram of adsorbent material was used for breakthrough test. The final molar ratio of Cu:Zn:Fe:Al was 0.40:0.40:0.13:0.07.

FIG. 1 is an XRD pattern for $Cu_{0.40}Zn_{0.40}Fe_{0.13}Al_{0.07}(OH)_2(CO_3^{2-})_{0.10}.mH_2O$ according to example 3. The figure illustrates the peaks locations for both hydrotalcite-like and aurichalcite-like structure that characterize the claimed $Cu_wZn_xFe_yAl_z(OH)_2(CO_3^{2-})_{(y+z)/2}.mH_2O$ compounds.

The crystallinity characteristics of XRD pattern depict two adjacent peaks at about 2θ of 11.5 and 13.0°. These two reflections at low angle of 2θ indicated the presence of two different relatively high distances between adjacent lattice planes (i.e., d-spacing is relatively high). This above stated characteristic facilitated more room for adsorption which renders this type of material a good adsorbent. The presence of metals with high sulfur affinity and the simultaneous structural characteristics of hydrotalcite-like and aurichalcite-like compounds make the material of this invention possess higher sulfur removal capacity.

Example 4

Same adsorbent material as in Example 3; wherein the material is subjected to temperature of 450° C. for 2 hours prior to testing.

Example 5

Same adsorbent material as in Example 3; wherein 0.3 gram of adsorbent material was used.

The experimental results for sulfur uptake for the examples 1-5 can be taken from the following Table 1.

TABLE 1

Experimental results for the examples

| Example No. | Adsorbent | Sulfur uptake (g $H_2S$/g) |
|---|---|---|
| 1 | $Cu_{0.33}Zn_{0.33}Fe_{0.17}Al_{0.17}(OH)_2(CO_3^{2-})_{0.17}•mH_2O$ | 0.189 |
| 2 | $Cu_{0.33}Zn_{0.33}Fe_{0.22}Al_{0.11}(OH)_2(CO_3^{2-})_{0.17}•mH_2O$ | 0.269 |
| 3 | $Cu_{0.40}Zn_{0.40}Fe_{0.13}Al_{0.07}(OH)_2(CO_3^{2-})_{0.10}•mH_2O$ | 0.388 |
| 4 | $Cu_{0.40}Zn_{0.40}Fe_{0.13}Al_{0.07}(OH)_2(CO_3^{2-})_{0.10}•mH_2O$ | 0.359 |
| 5 | $Cu_{0.40}Zn_{0.40}Fe_{0.13}Al_{0.07}(OH)_2(CO_3^{2-})_{0.10}•mH_2O$ | 0.990 |

The results of sulfur uptake are significantly improved compared to results as can be, for example, taken from the disclosure of M. A. Othman et al., Journal of Hazardous Materials, 254-255 (2013) 221-227.

The features disclosed in the foregoing description, the claims and the drawing may, both separately and in any combination thereof, be material for realizing the invention in diverse forms thereof.

The invention claimed is:

1. Adsorbent material having the following formula:

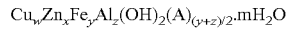

$Cu_wZn_xFe_yAl_z(OH)_2(A)_{(y+z)/2}.mH_2O$ wherein w+x+y+z=1; and 0.20≤w≤0.60; 0.20≤x≤0.60; 0.05≤y≤0.25; 0.05≤z≤0.25; 0.20≤(y+z)≤0.33; and 0.50≤m≤0.80, wherein A is $CO_3^{2-}$, $SO_4^{2-}$, $Cl^-$ and/or $NO_3^-$, wherein the adsorbent material is not calcined, and wherein the adsorbent material is present in hydrotalcite-like and/or aurichalcite-like structure.

2. Adsorbent material according to claim 1 having the formula $Cu_{0.40}Zn_{0.40}Fe_{0.13}Al_{0.07}(OH)_2(CO_3^{2-})_{0.1}.mH_2O$.

3. A method of removing sulfur-containing matter from gaseous streams comprising exposing a gaseous stream to the absorbent material of claim 1.

4. The method according to claim 3, wherein the sulfur-containing matter is selected from $H_2S$, $SO_2$ and/or COS.

* * * * *